Figure 1:
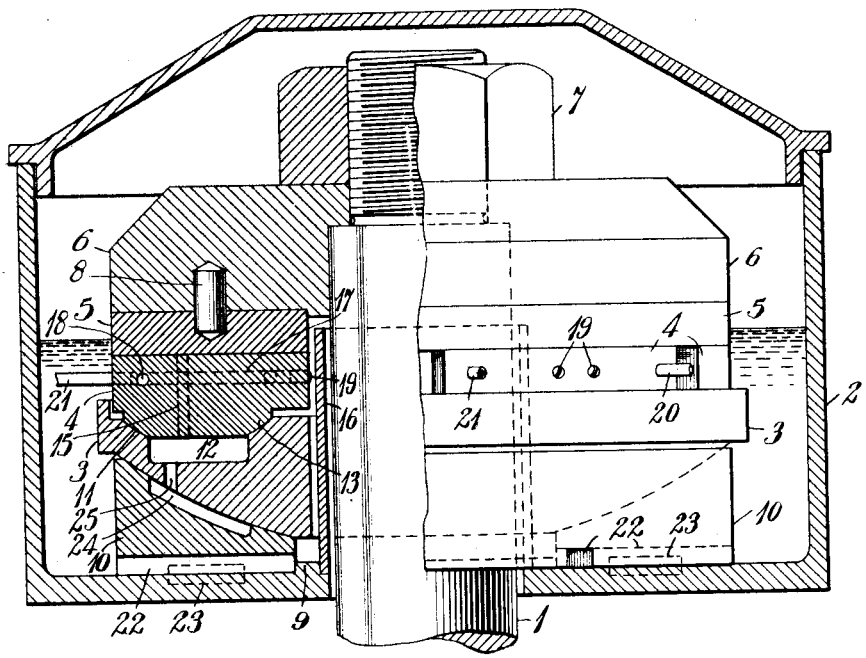

A. KINGSBURY.
THRUST BEARING.
APPLICATION FILED AUG. 12, 1912.

1,117,502.

Patented Nov. 17, 1914.

WITNESSES:
Fred H. Miller
B. B. Hines

INVENTOR.
Albert Kingsbury
BY
R. H. Sanborn
ATTORNEY.

UNITED STATES PATENT OFFICE.

ALBERT KINGSBURY, OF PITTSBURGH, PENNSYLVANIA.

THRUST-BEARING.

1,117,502.     Specification of Letters Patent.     Patented Nov. 17, 1914.

Application filed August 12, 1912. Serial No. 714,502.

*To all whom it may concern:*

Be it known that I, ALBERT KINGSBURY, a citizen of the United States, and a resident of Pittsburgh, in the county of Allegheny and State of Pennsylvania, have invented a new and useful Improvement in Thrust-Bearings, of which the following is a specification.

My invention relates to thrust bearings which are adapted to operate under relatively high thrust pressures, and it has special reference to such bearings as comprise a plurality of radial shoes arranged to automatically maintain a film of lubricating fluid between the coöperating bearing surfaces.

One object of my invention is to provide, in a bearing of the class above indicated, means for reducing the friction in the pivotal support of each shoe in order that it may tilt readily and assume the most advantageous operating position when the movable member of the bearing is started.

Another object is to provide a simple and effective means for cooling each shoe when the bearing is in service.

Another object is to provide an automatically lubricated pivotal mounting for the member on which the radial bearing shoes are supported.

Other objects will be set forth hereinafter.

In Patent No. 947,242, granted January 25, 1910, on an application filed by me on May 20, 1907, I have shown and described a thrust bearing which operates successfully at relatively high speeds and under very high pressures. When a bearing of this character is at rest, the bearing surfaces of the shoes are in engagement with the surface of the coöperating bearing member, but when the bearing is in service and one of the parts is rotating, the shoes assume a tilted position, by reason of the wedging action of the oil or other lubricating fluid in which the bearing surfaces are immersed. In order to allow the shoes to assume this tilted position, they are pivotally supported. But, by reason of the high pressure between the bearing surfaces, there is ordinarily considerable friction in the pivotal mounting which prevents the shoe from tilting to the most effective position and also retards the tilting action when the movable member of the bearing is put into motion. The friction in the pivotal mounting also retards the reverse action when the bearing comes to rest and causes the bearing surface of the shoe to wear unequally. It is, of course, possible to provide a knife edge or a single point support for each shoe, but ordinarily when this expedient is resorted to, the bearing surfaces of the shoes soon become distorted by deflection since the pressure at all points on the bearing surface is relatively high.

According to one embodiment of my present invention, I provide hollow annular supports which form a closed chamber under each shoe when it is seated in position, but I provide a small hole through each shoe, substantially at right angles to the bearing surface at the point of maximum pressure, which largely equalizes the pressure on the shoe and very much relieves the coöperating surfaces of the pivotal mounting. In this arrangement, the relatively large diameter of the pivotal mounting and the equalization of pressure are such as to greatly reduce the distortion of the shoe.

Figure 2:
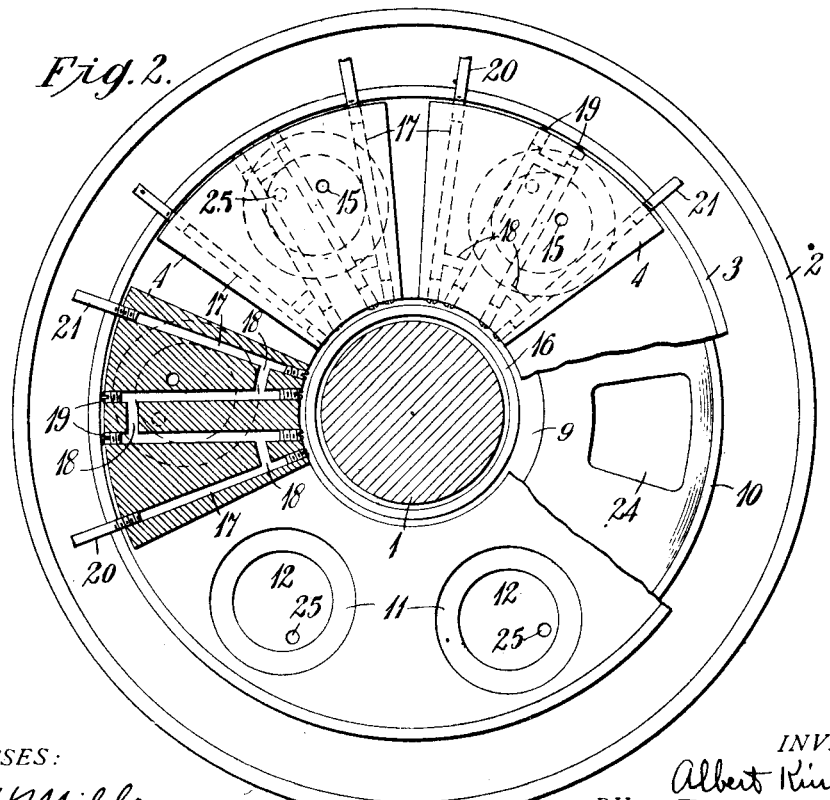

Figure 1 of the accompanying drawings is a partially sectional elevation of a thrust bearing constructed and arranged in accordance with my invention, and Fig. 2 is a plan view, with certain of the parts broken away, of one member of the bearing shown in Fig. 1.

Referring to the drawings, the structure here shown comprises a vertical shaft 1, a hollow stationary bearing support 2, into which the upper end of shaft extends and a supporting ring 3 on which segmental ring bearing shoes 4 are pivotally supported.

A single flange or collar 6 is secured to the upper end of the shaft 1 by means of a nut 7 and is provided with a bearing ring 5, which is held in position by dowel pins 8 and coöperates with the bearing shoes 4.

The stationary supporting member 2 is provided with a shoulder 9 and an annular projection 16 adjacent to the shaft 1, which extends above the bearing surfaces, constitutes the inner wall of an oil well and permits the surfaces to be immersed in oil. A ring 10 having a concave spherically curved surface is mounted in the member 2, adjacent to the shoulder 9 and constitutes a seat for the supporting ring 3 which is provided with a correspondingly curved convex bottom surface.

The ring 3 is provided with a series of spherically curved depressions 11 which are counterbored to provide a series of chambers 12. Each of the shoes 4 is provided with a projection 13 having a spherically curved surface which coöperates with the concave surface of the corresponding recess 11. By this means the shoes are pivotally supported on the ring 3 while the pressure is equally distributed among the several shoes by reason of the manner in which the ring 3 is mounted.

When the shoes 4 are in position, each of the chambers 12 is closed, except for a small hole 15, in each shoe, which forms a connection between the bearing surface of the shoe and the chamber.

Each of the shoes 4 is preferably provided with a plurality of radial holes or passages 17 having inter-connecting passages 18 and plugs 19 which complete a zig-zag path or passage through which water or other cooling fluid may be circulated. The outer ends of the outer holes or passages are respectively connected to an inlet pipe 20 and an outlet pipe 21.

The holes are so arranged that they may, if desired, be cored in casting the shoes. The tilting movement of the shoes is so slight and the weight which they are adapted to carry is so great that ordinary metal pipes may be used for connecting a pump or other source of cooling liquid (not shown) to the shoes without interfering with the operation of the bearing.

Other means for cooling the shoes or various cooling pipe connections may be used within the scope of my invention.

The bottom surface of the ring 10 is ribbed or grooved to provide radial passages 22 through which the oil may circulate as hereinafter pointed out. The ring is provided with a key 23 or is otherwise prevented from rotating on the base 2. Its upper spherically curved bearing surface is provided with a plurality of depressions 24 approximately corresponding in number and location to the chambers 12 in the ring 3 with which they respectively communicate by means of holes 25.

The arrangement of parts is such that the fluid pressure produced as above set forth in the chambers 12 also exists in the depressions 24 and serves to relieve and reduce the friction between the engaging surface of the rings 3 and 10. The depressions may be of any suitable shape.

When the bearing is in operation, each of the shoes 4 assumes a tilted position, by reason of the wedging action of the oil and, consequently, any friction which exists between the projections 13 of the shoes and the spherical surfaces of the supporting ring prevents the shoes from tilting to the most economical position and also retards such tilting action as actually takes place.

The wedging action above referred to produces pressures varying over the bearing surface of each shoe and I have located the hole 15 of shoe approximately at the point of maximum pressure. By this means a very material pressure is maintained in the lubricating fluid which is contained in the chambers 12 and 24. The fluid under pressure in these chambers tends not only to lift the shoes and separate the rings 3 and 10 thereby relieving the pressure between the coöperating contact surfaces, but also forces the lubricating fluid between the surfaces.

I have found that the spherical projection 13 of each shoe should be in advance of the center of the shoe in the direction of rotation if the shoe is a part of the stationary member of the bearing and that the point of maximum pressure is still further in advance of the center of the shoe, and, consequently, I have located the holes 15 and the projections 13 accordingly. The projections 13, which constitute the seats should also be eccentric radially, being displaced toward the outer circumferential surface of the shoe.

If the bearing is designed to operate in both directions of rotation, the seats will be centrally located circumferentially, but will be slightly displaced radially, as above indicated. For most classes of service where thrust bearings, capable of operating under very heavy loads, are utilized only a single direction of rotation is desired and, consequently, the shoe seats may be most economically located.

As the oil is gradually squeezed out of the chambers 12 and 24, oil is supplied to the bearing surfaces of the shoes from both the inner and the outer sections of the well, the oil level being maintained substantially constant by the passages 22 through which oil may circulate.

Structural variations may be effected without departing from the spirit of my invention, and I desire that only such limitations be imposed as are indicated in the appended claims.

I claim as my invention:

1. A bearing comprising a supporting member, a plurality of bearing shoes tiltably mounted thereon, a pressure chamber between each shoe and the supporting member, and means for establishing a communication between the bearing surface of each shoe and its pressure chamber.

2. A thrust bearing comprising an annular supporting member having a plurality of recessed pressure chambers, radial bearing shoes tiltably supported on said member and arranged to cover said chambers and passages for equalizing the pressure between the chambers and the bearing surfaces of the shoes.

3. A thrust bearing comprising an annular supporting member having a plurality of recessed pressure chambers, radial bearing shoes tiltably supported on said member and arranged to cover said chambers, each of said shoes having a hole transverse to its bearing surface for establishing a communication between said surface and one of said chambers.

4. A thrust bearing comprising a relatively movable bearing member, a relatively stationary supporting member having a plurality of recessed pressure chambers formed to provide spherically curved annular seats, radial bearing shoes coöperating with the movable bearing member and tiltably supported on said annular seats, and passages for establishing communication between the bearing surface of each shoe and its pressure chamber.

5. A thrust bearing comprising a relatively movable bearing member, a plurality of radial shoes coöperating therewith and each having a small hole extending through it substantially at right angles to its pressure surface at the point of maximum pressure thereon, a supporting member on which the shoes are tiltingly mounted having a plurality of recesses over which the shoes are severally supported, said recesses constituting closed pressure chambers with which the small holes in the shoes communicate, and a base on which the supporting member is pivotally mounted.

6. A bearing comprising a plurality of bearing members, a supporting member therefor having a spherically curved bottom surface, a base having a correspondingly curved upper surface provided with a plurality of depressions or chambers, and means for establishing a communication between the bearing surfaces and the depressions on chambers.

7. A bearing comprising a plurality of radial shoes, a supporting member therefor having a spherically curved bottom surface, a base having a correspondingly curved upper surface provided with a plurality of depressions or chambers, and fluid passages between the bearing surfaces of the shoes and the depressions or chambers, said radial shoes being arranged to maintain fluid pressure in said depressions or chambers.

8. A thrust bearing comprising a relatively movable bearing member, a plurality of radial shoes coöperating therewith and each having a small hole extending through it substantially at right angles to its pressure surface, a supporting member for the shoes having a series of recesses over which the shoes are severally supported and a base on which said supporting member is pivotally mounted, being thus adapted to compress fluid in said recesses and to relieve the pressure between the bearing surfaces of the shoes and the supporting member and between the supporting member and the base.

9. A thrust bearing comprising a relatively movable bearing member, a plurality of radial shoes coöperating therewith and each having a small hole extending through it substantially at right angles to its pressure surface at the point of maximum pressure thereon, a supporting member on which the shoes are pivotally mounted having a plurality of receses over which the shoes are severally supported, said recesses constituting closed pressure chambers with which the small holes in the shoes communicate, a base on which the supporting member is pivotally mounted having a spherically curved upper surface provided with a plurality of depressions or chambers, which are closed by said supporting member and communicate with the aforesaid recesses, which are located under the several shoes.

In testimony whereof, I have hereunto subscribed my name this 8th day of August, 1912.

ALBERT KINGSBURY.

Witnesses:
R. J. DEARBORN,
B. B. HINES.